United States Patent
Alampallam et al.

(10) Patent No.: US 9,978,247 B2
(45) Date of Patent: May 22, 2018

(54) SMART FABRIC THAT DETECTS EVENTS AND GENERATES NOTIFICATIONS

(71) Applicant: Microsoft Technology Licensing, LLC, Redmond, WA (US)

(72) Inventors: Narayanan V. Alampallam, Redmond, WA (US); Srinivas Bhaskar, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days. days.

(21) Appl. No.: 14/864,813

(22) Filed: Sep. 24, 2015

(65) Prior Publication Data
US 2017/0092098 A1    Mar. 30, 2017

(51) Int. Cl.
G08B 21/00     (2006.01)
G08B 21/18     (2006.01)
(Continued)

(52) U.S. Cl.
CPC ............. *G08B 21/18* (2013.01); *A41D 1/002* (2013.01); *G08B 21/02* (2013.01);
(Continued)

(58) Field of Classification Search
CPC .......................... A41D 1/002; G08B 21/0297
See application file for complete search history.

(56) References Cited

U.S. PATENT DOCUMENTS 5,111,818 A    5/1992   Suzuki et al.
6,640,202 B1   10/2003  Dietz et al.
(Continued)

FOREIGN PATENT DOCUMENTS

CN    102488334 A    6/2012
CN    203870762 U    10/2014
(Continued)

OTHER PUBLICATIONS

"International Search Report and Written Opinion for PCT Patent Application No. PCT/US2016/048813", dated Oct. 28, 2016, 20 pages.
(Continued)

*Primary Examiner* — Omeed Alizada
(74) *Attorney, Agent, or Firm* — Medley, Behrens & Lewis, LLC

(57) ABSTRACT

Various technologies described herein pertain to smart fabric that includes a sensor array, which includes sensor nodes arranged at respective sites in the fabric. The sensor nodes are configured to output signals indicative of detected conditions at the respective sites in the fabric. The fabric can further include a transmitter and a control unit. The control unit can be configured to receive the signals indicative of the detected conditions at the respective sites in the fabric from the sensor nodes, and transmit, using the transmitter, data specifying the detected conditions at the respective sites in the fabric. The data can be transmitted to a computing system for analyzing a state of the fabric to detect an occurrence of an event. The event can be a tear of the fabric, a torsion in the fabric greater than a threshold torsion, a strain in the fabric greater than a threshold strain.

20 Claims, 9 Drawing Sheets

(51) Int. Cl.
| | |
|---|---|
| *H04L 29/08* | (2006.01) |
| *A41D 1/00* | (2018.01) |
| *G08B 21/02* | (2006.01) |
| *H04B 1/034* | (2006.01) |
| *H04B 1/3827* | (2015.01) |
| *G08B 21/04* | (2006.01) |

(52) U.S. Cl.
CPC ....... *G08B 21/0446* (2013.01); *H04B 1/0343* (2013.01); *H04B 1/385* (2013.01); *H04L 67/12* (2013.01); *A41D 1/005* (2013.01)

(56) References Cited

U.S. PATENT DOCUMENTS

| | | | |
|---|---|---|---|
| 7,986,410 | B2 | 7/2011 | Bauer et al. |
| 8,948,839 | B1 | 2/2015 | Longinotti-Buitoni et al. |
| 2005/0001720 | A1* | 1/2005 | Mason .................. G01C 21/206 340/539.13 |
| 2007/0241904 | A1 | 10/2007 | Ozaki et al. |
| 2009/0272197 | A1 | 11/2009 | Ridao Granado et al. |
| 2010/0063652 | A1 | 3/2010 | Anderson |
| 2010/0148975 | A1 | 6/2010 | James et al. |
| 2010/0241464 | A1* | 9/2010 | Amigo .................... G06Q 40/08 705/4 |
| 2010/0280416 | A1* | 11/2010 | Hyde ...................... A61B 5/103 600/587 |
| 2012/0136231 | A1* | 5/2012 | Markel ................ A61B 5/0015 600/388 |
| 2012/0253234 | A1 | 10/2012 | Yang et al. |
| 2013/0137943 | A1 | 5/2013 | Pinto Rodrigues |
| 2014/0266752 | A1 | 9/2014 | John |
| 2015/0006780 | A1 | 1/2015 | Shao |
| 2015/0006870 | A1 | 1/2015 | Switzer et al. |
| 2016/0180078 | A1* | 6/2016 | Chhabra ................. G06F 21/31 726/19 |

FOREIGN PATENT DOCUMENTS

| | | |
|---|---|---|
| DE | 102010022878 A1 | 12/2011 |
| WO | 2014138204 A1 | 9/2014 |

OTHER PUBLICATIONS

Carpi, et al., "Electroactive Polymer-Based Devices for E-Textiles in Biomedicine", In Proceedings of IEEE Transactions on Information Technology in Biomedicine, vol. 9, Issue 3, Sep. 2005, pp. 295-318.

Castano, et al., "Smart Fabric Sensors and E-Textile Technologies: a Review", In Journal of Smart Materials and Structures, vol. 23 No. 5, Apr. 1, 2014, 28 pages.

"Ideas Generated During the Textile Sensors and Actuators Workshop", Retrieved on: Jun. 9, 2015, Retrieved at: <http://smartextiles.co.uk/workspace/upload/Project_Ideas.pdf>, 8 pages.

"Men's Fabric", Retrieved on: Jun. 9, 2015, Retrieved at: <http://shop.pearlizumi.com/cms/uploads/menfabricride.pdf>, 1 page.

Lorussi, et al., "Wearable, Redundant Fabric-Based Sensor Arrays for Reconstruction of Body Segment Posture", In Proceedings of IEEE Sensors Journal, vol. 4, Issue 6, Dec. 2004, pp. 807-818.

Kaplan, Ken, "Robotic Spider Dress Powered by Intel Smart Wearable Technology", Published on: Jan. 6, 2015, Retrieved at: <http://iq.intel.com/smart-spider-dress-by-dutch-designer-anouk-wipprecht/>, 7 pages.

Hiremath, et al., "Wearable Internet of Things: Concept, Architectural Components and Promises for Person-Centered Healthcare", In Proceedings of EAI 4th International Conference on Wireless Mobile Communication and Healthcare (Mobihealth), Nov. 3, 2014, 4 pages.

"Ohmatex Uses PolyPower Stretch Sensors in Smart Garments", GlobalLinker, Published on: Sep. 9, 2014, Retrieved At: <http://jetairways.globallinker.com/bizforum/news/ohmatex-uses-polypower-stretch-sensors-in-smart-garments/8033139?indid=0>, 1 page.

"LSM303DLHC Ultra Compact High Performance E-Compass: 3D Accelerometer and 3D Magnetometer Module", Retrieved on: Sep. 24, 2015, Retrieved at: <http://www.st.com/web/catalog/sense_power/FM89/SC1449/PF251940/>, 1 page.

"New Centimeter-Accurate GPS System Could Transform Virtual Reality and Mobile Devices", Published on: May 5, 2015, Retrieved at: <http://phys.org/news/2015-05-centimeter-accurate-gps-virtual-reality-mobile.html>, 5 pages.

Dorrier, Jason, "Sensors Embedded in Clothing? Check Out Sensoria Smart Socks", SingularityHUB, Published on: Nov. 20, 2013, Retrieved at: <http://singularityhub.com/2013/11/20/sensors-embedded-in-clothing-check-out-sensoria-smart-socks/>, 3 pages.

"Second Written Opinion Issued in PCT Application No. PCT/US2016/048813", dated Aug. 3, 2017, 9 Pages "Response to Written Opinion for PCT Patent Application No. PCT/US2016/048813", dated May 26, 2017, 14 pages.

"International Preliminary Report on Patentability Issued in PCT Application No. PCT/US2016/048813", dated Oct. 26, 2017, 10 Pages.

* cited by examiner

SMART FABRIC THAT DETECTS EVENTS AND GENERATES NOTIFICATIONS

BACKGROUND

Fabric may be torn, subjected to severe torsion (e.g., twisting), or subjected to severe strain (e.g., pulling, stretching) under various scenarios. For instance, there is a significant probability that fabric of a garment worn by a person may be torn, experience extreme torsion, or experience extreme strain when the person is assaulted. Conventional approaches for determining whether fabric has been torn, subjected to severe torsion, or subjected to severe strain commonly involve visual inspection or tactile observation of such fabric. For instance, fabric can be manually inspected to detect whether the fabric has been torn via visual or tactile observation and confirmation.

After confirmation of tearing, twisting, pulling, stretching, etc. of the fabric, dissemination of such information is oftentimes manually performed by an individual. For instance, an employee at a child's school may visually inspect a shirt worn by the child to identify that the shirt has been torn and the child has been in a fight. In response to identifying that the shirt has been torn, the employee may notify a parent of the child (e.g., by calling the parent, sending a message to the parent), indicating that the child has been in a fight and his shirt has been torn.

Moreover, techniques other than visual or tactile inspection are conventionally used to evaluate tears in the protective clothing industry (e.g., doctors' gloves, condoms). Such approaches commonly involve using chemical electrolytes to detect micro perforations. Yet, such techniques are not feasible for detecting perforations in articles of clothing during use of such clothing. Still other conventional approaches exist to detect macro tears using cumbersome equipment and techniques that are not feasible for in-use articles of clothing.

SUMMARY

Described herein are various technologies that pertain to smart fabric for detecting events and generating notifications. The fabric includes a sensor array. The sensor array includes a plurality of sensor nodes arranged at respective sites in the fabric. The sensor array can include Global Positioning System (GPS) sensors, magnetometers, Radio Frequency Identification (RFID) tags and RFID readers, accelerometers, a combination thereof, and so forth. The sensor nodes can be configured to output signals indicative of detected conditions at the respective sites in the fabric. The fabric can further include a transmitter and a control unit. The control unit can be configured to receive the signals indicative of the detected conditions at the respective sites in the fabric from the sensor nodes in the sensor array. Moreover, the control unit can be configured to transmit, using the transmitter, data specifying the detected conditions at the respective sites in the fabric. The data can be transmitted to a computing system for analyzing a state of the fabric to detect an occurrence of an event. The event can be a tear of the fabric, a torsion in the fabric greater than a threshold torsion, or a strain in the fabric greater than a threshold strain.

In accordance with various embodiments, the computing system can receive, from the transmitter comprised in the fabric, the data specifying the detected conditions at the sites in the fabric. The computing system can analyze the state of the fabric to detect an occurrence of an event. The state of the fabric can be analyzed based on the data specifying the detected conditions at the sites in the fabric. Moreover, the computing system, responsive to detection of the occurrence of the event, can cause a notification indicative of the event to be generated. For example, responsive to the detection of the occurrence of the event, the computing system can generate the notification indicative of the event and output the notification indicative of the event. According to another example, responsive to the detection of the occurrence of the event, the computing system can transmit an indicator specifying that the event has occurred to a disparate computing system. The indicator can cause the disparate computing system to output the notification indicative of the event.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
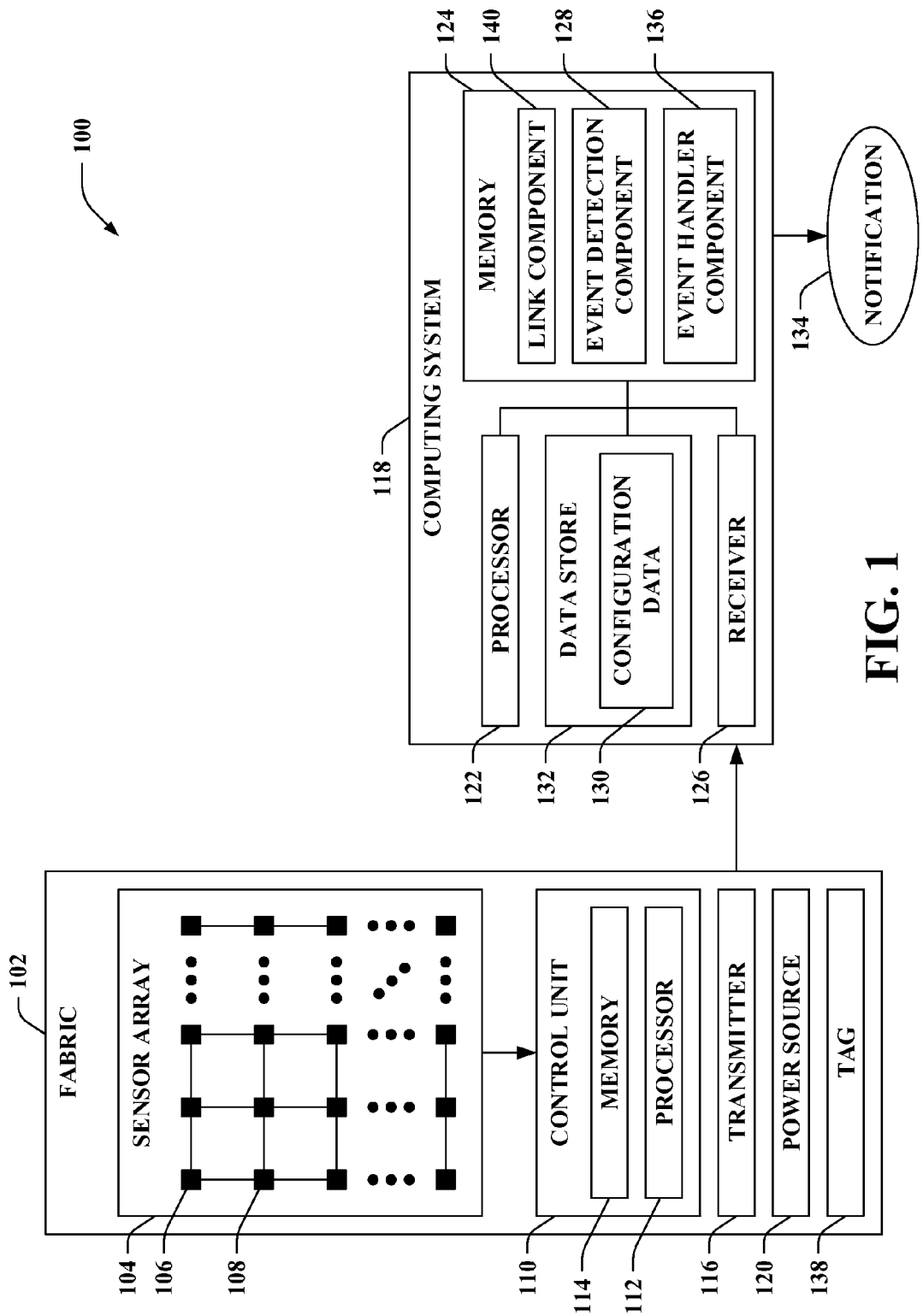
FIG. 1 illustrates a functional block diagram of an exemplary system that includes a smart fabric for detecting events and generating notifications.

Various technologies pertaining to smart fabric for detecting events and generating notifications are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, sensors (e.g., Internet of Things (IoT) sensors) embedded in or mechanically coupled to fabric can output signals indicative of detected conditions at corresponding sites in the fabric. Data specifying the detected conditions at the sites in the fabric can be analyzed to detect an occurrence of an event (e.g., using a machine learning classification algorithm or a heuristic). The event, for instance, can be a tear of the fabric, a torsion in the fabric greater than a threshold torsion, or a strain in the fabric greater than a threshold strain. Moreover, responsive to detection of the occurrence of the event, a notification indicative of the event can be generated and outputted. For instance, the notification can be a message sent to a mobile device and/or law enforcement, an alarm (e.g., an audible alarm, a visible alarm, haptic feedback corresponding to the alarm), or the like. The techniques described herein can enable real time (or near real time) identification and notification of tears, torsion, or strain in the fabric.

Accordingly, the techniques described herein enable events to be detected upon which notification generation is triggered. For instance, the detected events can correspond to scenarios in which a person wearing a garment formed of the fabric is a victim of assault, rape, or the like (e.g., since the fabric of the garment is likely to be torn, twisted, pulled, stretched, etc. in such scenarios). Thus, the event notification can be used to inform law enforcement, family and friends as well as trigger additional actions, such as an alarm.

Referring now to the drawings, FIG. 1 illustrates a system 100 that includes a smart fabric 102 for detecting events and generating notifications. The fabric 102 includes a sensor array 104. The sensor array 104 includes a plurality of sensor nodes arranged at respective sites in the fabric 102. The sites in the fabric 102 can include substantially any set of points in the fabric 102. For instance, the sensor array 104 can include a sensor node 106, a sensor node 108, and so forth. It is to be appreciated that substantially any number of sensor nodes can be included in the sensor array 104. Moreover, substantially any arrangement of the sensor nodes with respect to each other within the fabric 102 is intended to fall within the scope of the hereto appended claims. For instance, the number of sensor nodes and/or the relative arrangement of the sensor nodes at corresponding sites in the fabric 102 can be dependent upon a size of the fabric 102, a shape of the fabric 102, a type of item (e.g., a type of garment) formed from the fabric 102, and so forth.

The sensor array 104 can be a mesh type IoT sensor array. The sensors in the sensor array 104 can be millimeter scale sensors, for example. Further, the sensor array 104 can include substantially any type or types of sensors that detect conditions at respective sites in the fabric 102. The sensor array 104, for example, can include Global Positioning System (GPS) sensors, magnetometers, Radio Frequency Identification (RFID) tags and RFID readers, accelerometers, a combination thereof, and so forth. For instance, a sensor node in the sensor array 104 can include one or more types of sensors. Moreover, it is contemplated that two or more sensor nodes in the sensor array 104 can include the same type or types of sensors. Additionally or alternatively, two or more sensor nodes in the sensor array 104 can include differing types of sensors.

According to an example, the sensor array 104 (e.g., the sensor nodes of the sensor array 104) can be embedded in the fabric 102. Pursuant to an illustration, the sensor nodes can be incorporated into a loop, knit, weave, or the like of the fabric 102. By way of another example, the sensor array 104 (e.g., the sensor nodes of the sensor array 104) can be mechanically coupled to the fabric 102. For instance, the sensor nodes can be stitched, glued, or otherwise affixed to the fabric 102.

It is contemplated that substantially any type of fabric 102 is intended to fall within the scope of the hereto appended claims. Examples of fabric types include, but are not limited to, bamboo, cashmere, chenille, chiffon, corduroy, cotton, denim, flannel, fleece, georgette, jersey, leather, linen, microfiber, nylon, polyester, rayon, silk, velvet, wool, or a combination thereof. Yet, it is to be appreciated that the foregoing list of exemplary fabric types is non-exhaustive, and the fabric 102 can be substantially any other fabric type.

Further, the fabric 102 can be formed into a garment. Examples of garments that can be formed of the fabric 102 include, but are not limited to, a shirt, pants, shorts, a dress, a skirt, an undergarment, a jacket, a jersey, and so forth. Yet, it is contemplated that other types of garments can be formed of the fabric 102. Moreover, it is to be appreciated that items other than garments can be formed of fabric 102 (e.g., a safety net can be formed of the fabric 102, a fishing net can be formed of the fabric 102).

The sensor nodes in the sensor array 104 can be configured to output signals indicative of detected conditions at respective sites in the fabric 102. Thus, the sensor node 106 can output a signal indicative of a detected condition at a site of the sensor node 106 in the fabric 102, the sensor node 108 can output a signal indicative of a detected condition at a site of the sensor node 108 in the fabric 102, and so forth. The sensor array 104 enables a virtual wireframe of the fabric 102 to be created (e.g., the fabric 102 can be abstracted to the wireframe).

The fabric 102 can further include a control unit 110. The control unit 110 can include at least one processor 112 and memory 114. The processor 112 can be configured to execute instructions loaded into the memory 114.

The control unit 110 can be configured to receive the signals indicative of the detected conditions at the respective sites in the fabric 102 from the sensor nodes in the sensor array 104. For instance, the memory 114 can include instructions for periodically collecting the signals indicative of the detected conditions at the respective sites in the fabric 102 from the sensor nodes in the sensor array 104. Moreover, data specifying the detected conditions at the respective sites in the fabric (e.g., for one or more time intervals) can be stored in the memory 114.

The fabric 102 can further include a transmitter 116. The control unit 110 can be configured to transmit, using the transmitter 116, the data specifying the detected conditions at the respective sites in the fabric 102. The data can be transmitted by the transmitter 116 to a computing system 118 for analyzing a state of the fabric 102 to detect an occurrence of an event.

According to an example, the control unit 110 can be part of the sensor array 104. By way of illustration, the control unit 110 can be one (or more) of the sensor nodes in the sensor array 104. In accordance with another example, the control unit 110 can be a standalone unit separate from the sensor array 104; thus, the control unit 110 can be coupled to the sensor array 104 via a wireless and/or wired connection.

The fabric 102 can further include a power source 120. The power source 120 can supply power to the sensor array 104, the transmitter 116, and the control unit 110. However, it is to be appreciated that some types of sensors may not need to be powered by the power source 120 (e.g., a sensor may include a battery, a sensor may be powerless, a sensor may be powered by ambient radio frequency signals or movement of the fabric 102). Examples of the power source 120 include one or more batteries (e.g., rechargeable batteries), a solar cell, or the like. Moreover, it is to be appreciated that the power source 120 can be coupleable to an electrical outlet, an external battery, an external solar cell, or the like to recharge the power source 120; however, the claimed subject matter is not so limited.

The transmitter 116, the control unit 110, and the power source 120 can be embedded in the fabric 102 and/or mechanically coupled to the fabric 102. However, it is also contemplated that the transmitter 116, the control unit 110, and/or the power source 120 can be externally connected to the fabric 102.

As noted above, the data specifying the detected conditions at the respective sites in the fabric 102 can be sent to the computing system 118. The computing system 118 includes at least one processor 122, memory 124, and a receiver 126. The processor 122 is configured to execute instructions loaded into the memory 124 (e.g., one or more systems loaded into the memory 124 are executable by the processor 122, one or more components loaded into the memory 124 are executable by the processor 122). Moreover, the receiver 126 can receive a transmission from the transmitter 116 of the fabric 102.

According to various examples, the computing system 118 can be or include a computing device. Pursuant to various illustrations, the computing device can be a desktop computing device, a mobile computing device (e.g., a laptop computing device, a mobile telephone, a smartphone, a tablet computing device, a wearable computing device, a handheld computing device, a portable gaming device, a personal digital assistant, a camera), a gaming console, an in-vehicle communications and infotainment system, or the like. In accordance with other examples, the computing system 118 can be or include one or more server computing devices. For instance, the computing system 118 can be or include one or more datacenters, where a datacenter includes a plurality of server computing devices. Additionally or alternatively, the computing system 118 can be a distributed computing system.

The transmitter 116 of the fabric 102 and the receiver 126 of the computing system 118 can transfer information therebetween via a wireless connection. Substantially any type of wireless technology can be used to exchange information between the transmitter 116 and the receiver 126 including, but not limited to, wireless fidelity (WiFi), Bluetooth, a mobile telecommunications technology, or the like. By way of illustration, the transmitter 116 can be a Bluetooth transmitter and the receiver 126 can be a Bluetooth receiver; thus, the data specifying the detected conditions can be sent from the fabric 102 to the computing system 118 while the fabric 102 and the computing system 118 are positioned within physical proximity of each other (e.g., within a range on the order of 10 meters). Pursuant to another illustration, the transmitter 116 can be a 4G transmitter (fourth generation of mobile communications technology) and the receiver 126 can be a 4G receiver; following this illustration, the fabric 102 and the computing system 118 need not be within geographic proximity of each other when the data specifying the detected conditions is sent from the fabric 102 to the computing system 118.

The memory 124 of the computing system 118 can include an event detection component 128; thus, the event detection component 128 can be executable by the processor 122. The event detection component 128 can be configured to receive the data specifying the detected conditions at the sites in the fabric 102. The event detection component 128 can receive such data from the transmitter 116 included in the fabric 102 via the receiver 126 of the computing system 118. The event detection component 128 can also be configured to analyze a state of the fabric 102 to detect an occurrence of an event. The state of the fabric 102 can be analyzed by the event detection component 128 based on the data specifying the detected conditions at the sites in the fabric 102. The event detection component 128, responsive to detection of the occurrence of the event, can further be configured to cause a notification 134 indicative of the event to be generated.

According to an example, the event detection component 128 can detect the occurrence of the event based on the data specifying the detected conditions at the sites in the fabric 102 using a machine learning classification algorithm. Following this example, the event detection component 128 can use the machine learning classification algorithm to classify whether the data specifying the detected conditions at the sites in the fabric 102 represents a tear, a torsion greater than a threshold torsion, a strain greater than a threshold strain, or no detected event in the fabric 102. For instance, a machine learning model can be trained for various sizes of a type of garment (e.g., a particular machine learning model can be trained for shirts regardless of shirt size); however, it is also contemplated that differing models can be trained for differing sizes of a type of garment (e.g., a first machine learning model can be trained for small shirts, a second machine learning model can be trained for medium shirts, and a third machine learning model can be trained for large shirts). It is to be appreciated that differing machine learning models can be used for differing types of garments (e.g., a first machine learning model can be used for shirts, a second machine learning model can be used for pants); however, it is also contemplated that the same machine learning model can be used for differing types of garments. Further, it is contemplated that the machine learning model(s) can be updated over time (e.g., as additional training of such model(s) is performed). By way of another example, the event detection component 128 can detect the occurrence of the event based on the data specifying the detected conditions at the sites in the fabric 102 using a heuristic.

The sensor array 104 provides a mechanism by which the fabric 102 is able to communicate its physical state. Detected conditions at the respective sites in the fabric 102 can be determined and analyzed by the event detection component 128 to evaluate spatial configuration of the sites. The event detection component 128 can interpret the sites in the fabric 102 as a wireframe that describes the fabric 102 in a virtual space. The event detection component 128 can analyze the detected conditions at the sites in the fabric 102 using experiment-based heuristics or a trained machine learning classification algorithm (e.g., trained machine learning model(s)). Thus, the event detection component 128 can classify a particular configuration of the detected conditions at the sites in the fabric 102 (e.g., a data set at a particular time interval) as a state of tension, torsion, tear or no detected event based on configuration data 130 retained in a data store 132 of the computing system 118. The configuration data 130 can include historical data or training data (e.g., data models). The configuration data 130 can be used by the event detection component 128 to detect when a connection between sensor nodes in the sensor array 104 is broken (e.g., a tear), when a strain greater than a threshold strain occurs, or when a torsion greater than a threshold torsion occurs. The configuration data 130, for instance, can be updated over time to enhance detection of an occurrence of an event. Moreover, according to an example, to enhance accuracy of tear detection, the sensor nodes of the sensor array 104 can be attached to adjacent nodes mechanically using a tripwire mechanism, which can also be embedded in the fabric 102. Thus, when a tripwire breaks (e.g., during fabric tear), a tear can be inferred electronically.

In the example depicted in FIG. 1, the memory 124 of the computing system 118 can further include an event handler component 136; accordingly, the event handler component 136 can be executable by the processor 122. The event handler component 136 can be configured to generate the notification 134 indicative of the event responsive to the detection of the occurrence of the event by the event detection component 128. Moreover, the event handler component 136 can be configured to output the notification 134 indicative of the event. For instance, the event handler component 136 can output the notification 134 by sending the notification 134 to disparate computing system(s) (e.g., sending a message to one or more disparate computing system(s), sending a message to law enforcement), outputting an alarm, or the like.

The notification 134 can include information pertaining to the event. For instance, the notification 134 can specify a type of event (e.g., tear, torsion, strain), a time of the event, a duration of the event, a level of severity of the event, a frequency of the event during a period of time, a geographic location at which the event occurred (e.g., the geographic location of the fabric 102 when the event occurred), and so forth.

By way of example, the event handler component 136 can cause the notification 134 to be displayed on a display screen of the computing system 118 or a disparate computing system. According to another example, the event handler component 136 can cause the notification 134 to be outputted via a speaker of the computing system 118 or a disparate computing system. In accordance with yet another example, the event handler component 136 can cause haptic feedback corresponding to the notification 134 to be provided via the computing system 118 or a disparate computing system. Moreover, the event handler component 136 can cause a combination of the foregoing. Yet, it is to be appreciated that other types of notifications are intended to fall within the scope of the hereto appended claims.

The plurality of sensor nodes of the sensor array 104 in the fabric 102 can be utilized to gather data regarding the detected conditions at the sites in the fabric 102. A detected condition in the fabric 102 can be a physical, quantifiable, measurable property at a site or set of sites in the fabric 102. Moreover, the collection of data can be used to enable the event detection component 128 to detect when an event occurs. The event, for instance, can be a tear of the fabric 102, a torsion in the fabric greater than a threshold torsion, or a strain in the fabric greater than a threshold strain. Thus, the event detection component 128 can detect when the fabric 102 is torn, undergoes severe torsion (e.g., twisting), or experiences severe strain (e.g., pulling, stretching). Further, the event handler component 136 can process the notification 134 and perform an action responsive to detection of the event (e.g. send a message to a disparate computing device, notify law enforcement, sound an alarm).

The sensor array 104 can be a mesh sensor network that can enable collection and transmission of spatially descriptive data to the computing system 118 via wireless transmission. Such transmission can be at a regular frequency (e.g., once every second or substantially any other frequency). The set of physical characteristics that describe the sites in the fabric 102 can represent an abstraction or wireframe of the fabric 102 in a virtual world. The event detection component 128 can execute commands to compare the data specifying the detected conditions of the respective sites in the fabric 102 with predetermined data models (e.g., the configuration data 130) that correspond to various output states, such as tear, torsion, or strain. If, upon execution of the comparison, the event detection component 128 identifies one of these states (e.g., tear, torsion, or strain), further action can be triggered. Such action to be performed by the event handler component 136.

According to various examples, the fabric 102 can further include a tag 138. The tag 138 can identify the sensor array 104 and/or sensor nodes included in the sensor array 104. The tag 138 can be a scannable label of the fabric 102; the tag 138 can be readable (e.g., by the computing system 118) to initiate analyzing a state of the fabric 102. Examples of the tag 138 include an RFID tag, a near field communication (NFC) chip, a barcode, or a quick response (QR) code; however, it is to be appreciated that other types of tags are intended to fall within the scope of the hereto appended claims.

Moreover, the memory 124 of the computing system 118 can further include a link component 140. The link component 140 can be executable by the processor 122. The link component 140 can be configured to read the tag 138 of the fabric 102. Moreover, responsive to the tag 138 being read, the link component 140 can initiate the analyzing of the state of the fabric 102. Thus, the computing system 118 can beginning tracking the state of the fabric 102 responsive to the tag 138 being read by the link component 140.

Pursuant to an example, security can be provided via the link component 140. By way of illustration, the link component 140 may only be able to initiate analyzing the state of the fabric 102 if the computing system 118 is a trusted system for the fabric 102 (e.g., a cookie can be retained in the memory 124 or the data store 132 of the computing system 118 that allows access to the fabric 102). The link component 140 can fail to initiate analyzing the state of the fabric 102 if the computing system 118 is not a trusted system for the fabric 102 (e.g., the computing system 118 lacks the cookie allowing access to the fabric 102). According to another illustration, the link component 140 can send a request for accessing the fabric 102 to an authorization computing system responsive to the tag 138 being read. Responsive to sending the request, a response message that either accepts or denies the request can be received from the authorization computing system. If accepted, then the link component 140 can initiate the analyzing of the state of the fabric 102; alternatively, if denied, then the link component 140 can be prohibited from initiating the analysis of the state of the fabric 102.

Figure 2:
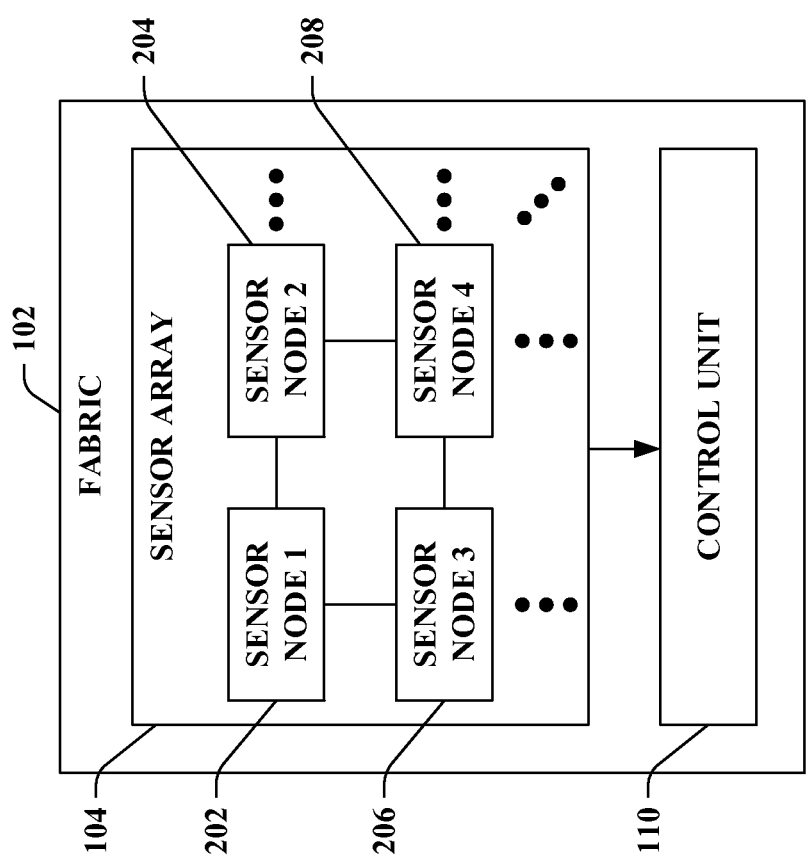
FIG. 2 illustrates a functional block diagram of an example of the fabric.

With reference to FIG. 2, illustrated is an example of the fabric 102. As depicted in FIG. 2, the fabric 102 includes the sensor array 104 and the control unit 110. Yet, as described herein, it is contemplated that the control unit 110 can be external to the fabric 102.

The sensor array 104 includes a plurality of sensor nodes arranged at respective sites in the fabric 102. In the depicted example, the sensor array 104 includes a sensor node 1 202, a sensor node 2 204, a sensor node 3 206, and the sensor node 4 208, etc. (collectively referred to herein as sensor nodes 202-208). The sensor array 104 can include substantially any number of sensor nodes 202-208. Moreover, the sensor array 104 can have substantially any arrangement of the sensor nodes 202-208 with respect to each other in the fabric 102.

According to an example, the sensor nodes 202-208 in the sensor array 104 can include respective GPS sensors (e.g., the sensor node 1 202 can include a first GPS sensor, the sensor node 2 204 can include a second GPS sensor). Signals outputted by the GPS sensors can be indicative of detected geographic coordinates at the respective sites in the fabric 102. For instance, a GPS sensor can send a signal indicative of x, y, z coordinates of such sensor to the control unit 110 during a particular time interval; accordingly, the x, y, z coordinates can be allocated to a site in the fabric 102 corresponding to the GPS sensor for the particular time interval.

By way of another example, the sensor nodes 202-208 in the sensor array 104 can include respective magnetometers (e.g., the sensor node 1 202 can include a first magnetometer, the sensor node 2 204 can include a second magnetometer). Signals outputted by the magnetometers can be indicative of detected magnetic moments at the respective sites in the fabric 102. A magnetometer can send, to the control unit 110, a signal indicative of magnetic moments in x, y, and z directions (Mx, My, and Mz) detected at a site in the fabric 102 of the magnetometer during a particular time interval; thus, Mx, My, and Mz can be allocated to the site in the fabric 102 corresponding to the magnetometer for the particular time interval.

Pursuant to yet another example, the sensor nodes 202-208 in the sensor array 104 can include respective accelerometers (e.g., the sensor node 1 202 can include a first accelerometer, the sensor node 2 204 can include a second accelerometer). Signals outputted by the accelerometers can be indicative of detected accelerations at the respective sites in the fabric 102. An accelerometer can send, to the control unit 110, a signal indicative of accelerations in x, y, and z directions (x(g), y(g), and z(g)) detected at a site in the fabric 102 of the accelerometer during a particular time interval; accordingly, x(g), y(g), and z(g) can be allocated to the site in the fabric 102 corresponding to the accelerometer for the particular time interval.

By way of illustration, each of the sensor nodes 202-208 can include a GPS sensor and an accelerometer. Following this illustration, the sensor node 1 202 can output a signal P1(x, y, z, x(g), y(g), z(g)), the sensor node 2 204 can output a signal P2(x, y, z, x(g), y(g), z(g)), and so forth. Thus, the signal P1 can specify the coordinates and accelerations measured at a site corresponding to the sensor node 1 202, the signal P2 can specify the coordinates and accelerations measured at a site corresponding to the sensor node 2 204, etc.

By way of another illustration, each of the sensor nodes 202-208 can include a magnetometer and an accelerometer. Following this illustration, each sensor node 202-208 in the fabric 102 can detect spatial orientation and movement. When torsion and strain occur, a particular movement and change in spatial orientation can result for at least some of the sites on the fabric 102. These patterns can be captured and analyzed (e.g., by the event detection component 128, using a machine learning classification algorithm, using a heuristic). Pursuant to this illustration, the sensor node 1 202 can output a signal P1(Mx, My, Mz, x(g), y(z), z(g)), the sensor node 2 204 can output a signal P2(Mx, My, Mz, x(g), y(z), z(g)), and so forth. The signal P1 can specify the magnetic moments and accelerations measured at a site corresponding to the sensor node 1 202, the signal P2 can specify the magnetic moments and accelerations measured at a site corresponding to the sensor node 2 204, etc.

Figure 3:
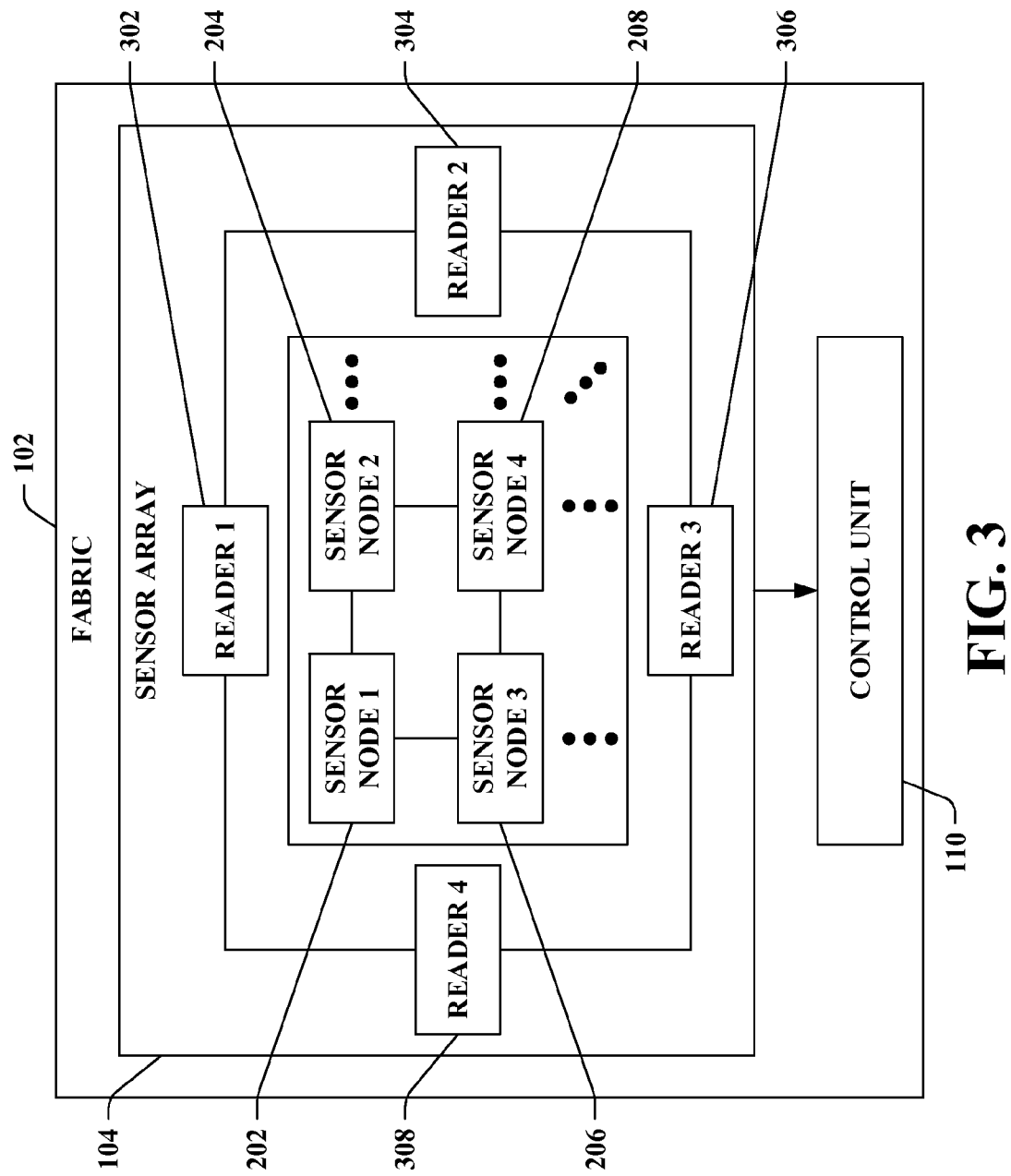
FIG. 3 illustrates a functional block diagram of another example of the fabric.

Now turning to FIG. 3, illustrated is another example of the fabric 102. The fabric 102 again includes the sensor array 104 and the control unit 110; yet, as noted herein, the control unit 110 can alternatively be external to the fabric 102. As depicted, the sensor array 104 includes the sensor nodes 202-208. Moreover, in the example shown in FIG. 3, the sensor array 104 includes a reader 1 302, a reader 2 304, a reader 3 306, and a reader 4 308 (collectively referred to herein as readers 302-308). While four readers 302-308 are depicted in FIG. 3, it is to be appreciated that any number of readers 302-308 greater than four can be included in the sensor array 104.

Moreover, while FIG. 3 shows the readers 302-308 surrounding the sensor nodes 202-208, it is to be appreciated that the readers 302-308 and the sensor nodes 202-208 can be positioned at sites having substantially any orientation relative to each other in the fabric 102. Further, the readers 302-308 can be located at relatively static positions (e.g., at corners of the fabric 102, on a belt of an individual wearing a garment formed from the fabric 102)

Following the example depicted in FIG. 3, the sensor nodes 202-208 can respectively include RFID tags. Moreover, the readers 302-308 can be RFID readers. Following this example, signals outputted by the sensor array 104 can be indicative of detected distances between the RFID tags and the RFID readers. For instance, for an RFID tag included in the sensor node 1 202 and during a particular time interval, the sensor array 104 can output signal(s) indicative of a distance between the RFID tag and the reader 1 302 (d1), a distance between the RFID tag and the reader 2 304 (d2), a distance between the RFID tag and the reader 3 306 (d3), and a distance between the RFID tag and the reader 4 308 (d4).

Pursuant to an illustration, each of the sensor nodes 202-208 in the sensor array 104 can include an RFID tag and an accelerometer. Following this illustration, the sensor array 104 can output P1(d1, d2, d3, d4, x(g), y(g), z(g)) for sensor node 1 202, P2(d1, d2, d3, d4, x(g), y(g), z(g)) for sensor node 2 204, and so forth. Thus, the control unit 110 can receive signal(s) indicative of distances from each of the readers 302-308 to a site corresponding to the sensor node 1 202 as well as accelerations measured at the site corresponding to the sensor node 1 202, signal(s) indicative of distances from each of the readers 302-308 to a site corresponding to the sensor node 2 204 as well as accelerations measured at the site corresponding to the sensor node 2 204, etc.

Figure 4:
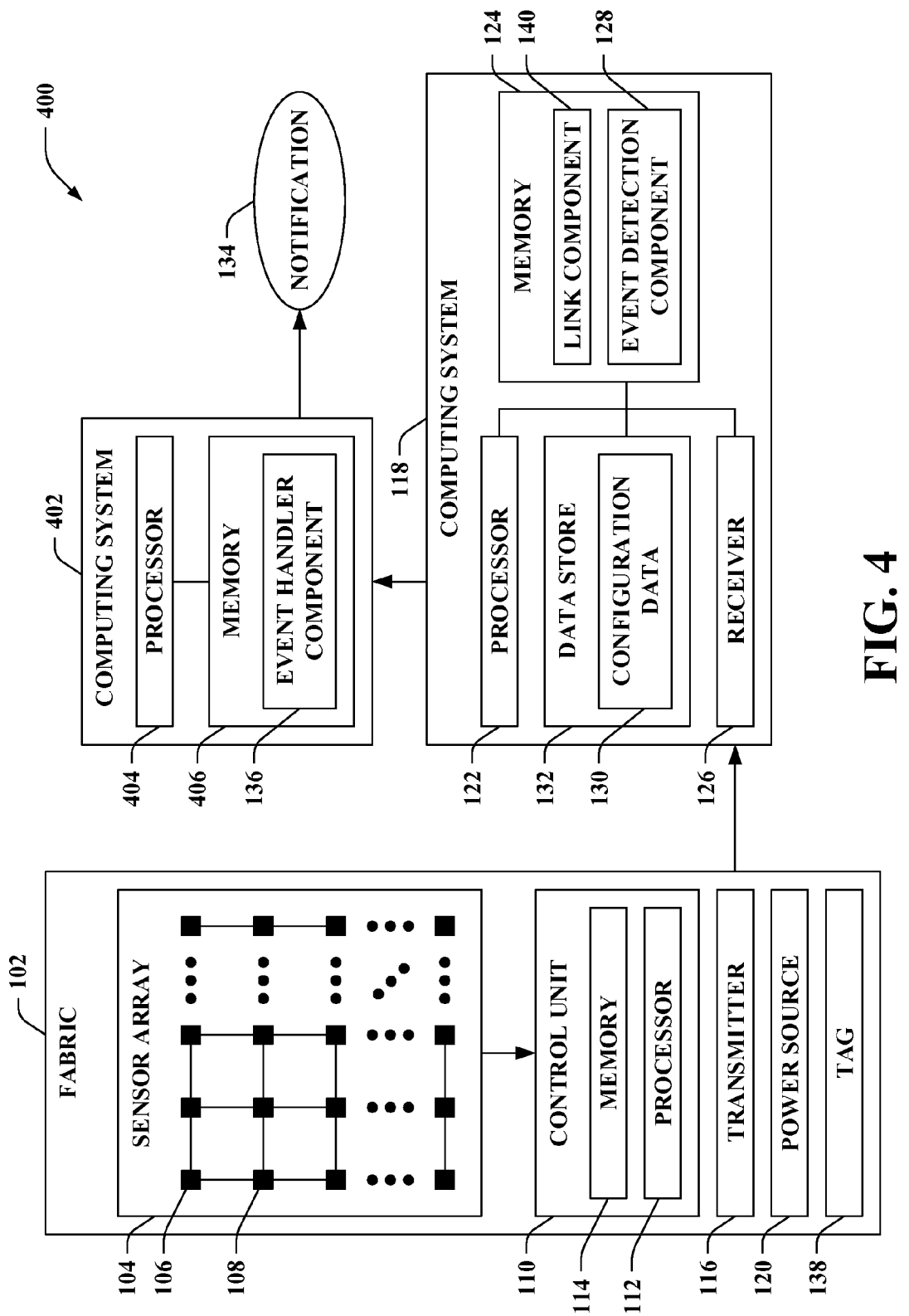
FIG. 4 illustrates a functional block diagram of another exemplary system that includes the fabric for detecting events and generating notifications.

Turning to FIG. 4, illustrated is another exemplary system 400 that includes the fabric 102 for detecting events and generating notifications. As shown in FIG. 4, the system 400 includes the computing system 118. The memory 124 of the computing system 118 can again include the event detection component 128.

The event detection component 128 can be configured to receive, from the transmitter 116 included in the fabric 102 via the receiver 126, the data specifying the detected conditions at the sites in the fabric 102. The event detection component 128 can also be configured to analyze a state of the fabric 102 to detect an occurrence of an event. Responsive to detection of the occurrence of the event, the event detection component 128 can be configured to cause the notification 134 indicative of the event to be generated. In the example shown in FIG. 4, the event detection component 128 can cause the notification 134 to be generated by transmitting an indicator specifying that the event has occurred to a computing system 402 (e.g., a disparate computing system).

The computing system 402 includes at least one processor 404 and memory 406. The processor 404 is configured to execute instructions loaded into the memory 406 (e.g., one or more systems loaded into the memory 406 are executable by the processor 404, one or more components loaded into the memory 406 are executable by the processor 404). As shown in the example of FIG. 4, the memory 406 includes the event handler component 136; accordingly, the event handler component 136 can be executable by the processor 404.

Following this example, the event handler component 136 of the computing system 402 can be configured to receive the indicator that specifies that the event has occurred from the computing system 118. Moreover, the event handler component 136 can be configured to output the notification 134 indicative of the event responsive to receipt of the indicator specifying that the event has occurred. Thus, the indicator generated by the event detection component 128 can cause the computing system 402 to output the notification 134 indicative of the event.

According to various examples, the computing system 402 can be or include a computing device. Pursuant to various illustrations, the computing device can be a desktop computing device, a mobile computing device (e.g., a laptop computing device, a mobile telephone, a smartphone, a tablet computing device, a wearable computing device, a handheld computing device, a portable gaming device, a personal digital assistant, a camera), a gaming console, an in-vehicle communications and infotainment system, or the like. In accordance with other examples, the computing system 402 can be or include one or more server computing devices. For instance, the computing system 402 can be or include one or more datacenters, where a datacenter includes a plurality of server computing devices. Additionally or alternatively, the computing system 402 can be a distributed computing system.

According to an illustration, the computing system 402 can be a notification processing service (e.g., a backend cloud service) that can push notifications to other computing systems, sound alarms, contact law enforcement, etc. The computing system 402 (e.g., the event handler component 136) can be triggered to perform an action responsive to receipt of the indicator from the computing system 118 (e.g., from the event detection component 128). An action performed by the computing system 402, for instance, can be a function of a type of event (e.g., tear, torsion, strain), a time of the event, a duration of the event, a level of severity of the event, a frequency of the event during a period of time, a geographic location at which the event occurred, and so forth.

Figure 5:
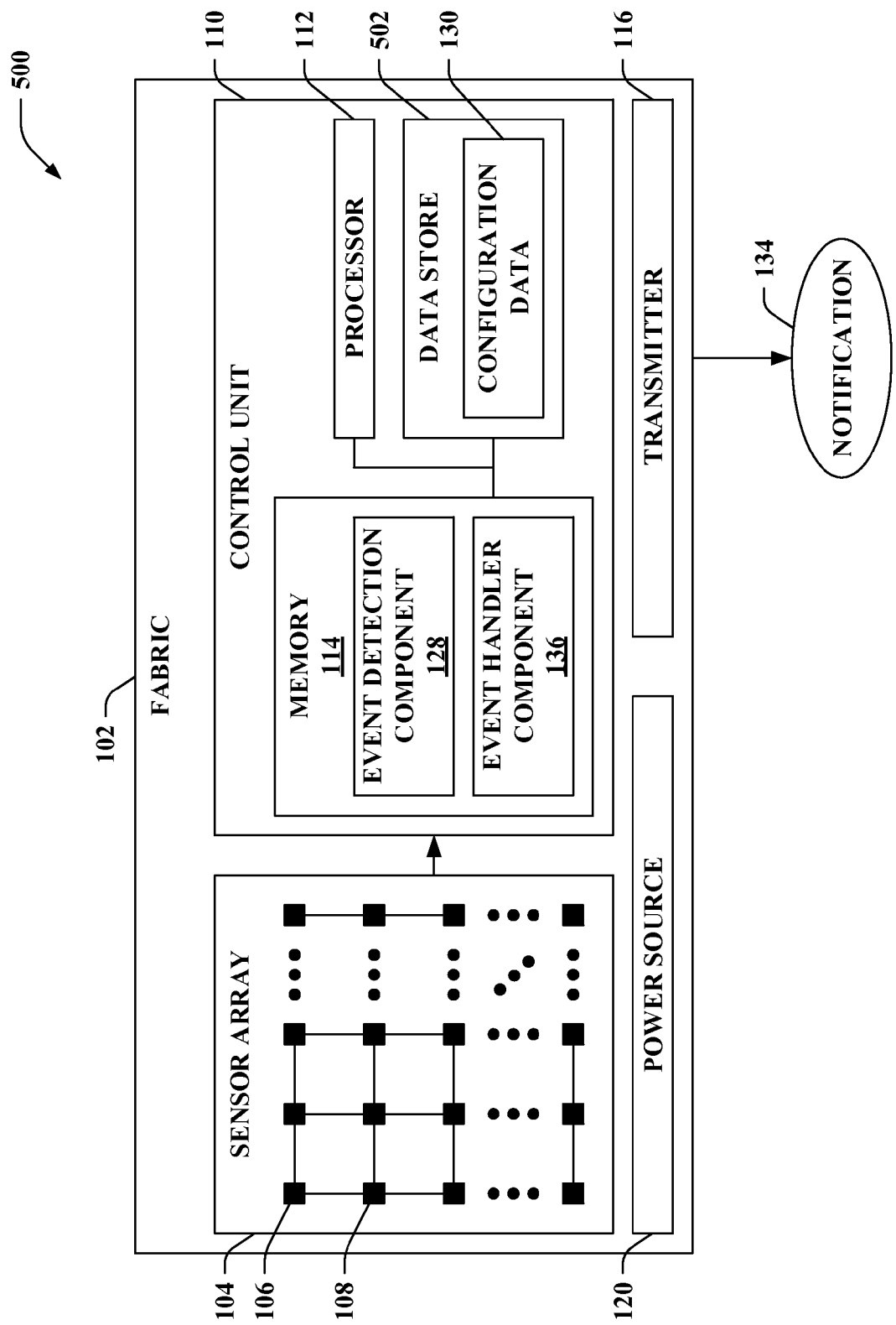
FIG. 5 illustrates a functional block diagram of another exemplary system that includes the fabric.

Now turning to FIG. 5, illustrated is another exemplary system 500 that includes the fabric 102. Similar to above, the fabric 102 can include the sensor array 104, the control unit 110, the transmitter 116, and the power source 120. In the depicted example of FIG. 5, the memory 114 of the control unit 110 can further include the event detection component 128 and the event handler component 136; thus, the event detection component 128 and the event handler component 136 can be executable by the processor 112. Moreover, the control unit 110 can include a data store 502, which can retain the configuration data 130.

According to the example shown in FIG. 5, the control unit 110 of the fabric 102 can receive the signals indicative of the detected conditions at the respective sites in the fabric 102 from the sensor nodes in the sensor array 104. Moreover, the event detection component 128 can analyze the state of the fabric 102 to detect an occurrence of an event based on the detected conditions at the sites in the fabric 102. Moreover, the event handler component 136 of the control unit 110 can output a notification 134 responsive to the detection of the occurrence of the event. For instance, the event handler component 136 can cause the transmitter 116 to send the notification 134 to differing computing system(s).

Figure 6:
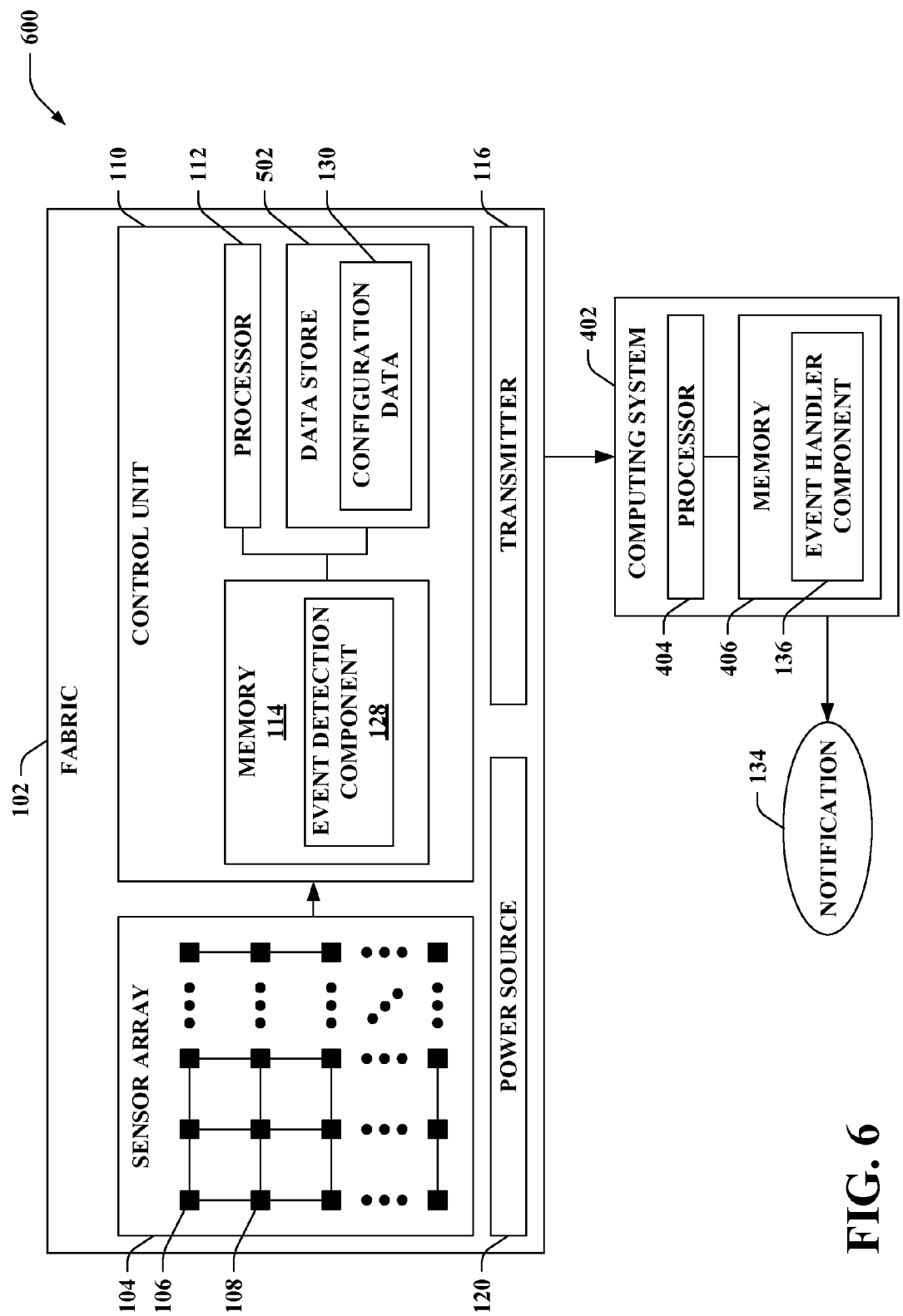
FIG. 6 illustrates a functional block diagram of yet another exemplary system that includes the fabric.

Now referring to FIG. 6, illustrated is yet another exemplary system 600 that includes the fabric 102. Again, the fabric 102 can include the sensor array 104, the control unit 110, the transmitter 116, and the power source 120. In the example shown in FIG. 6, the memory 114 of the control unit 110 can further include the event detection component 128; accordingly, the event detection component 128 can be executable by the processor 112. The system 600 further includes the computing system 402, which includes the processor 404 and the memory 406. The memory 406 of the computing system 402 further includes the event handler component 136, which can be executable by the processor 404.

Following this example, the control unit 110 of the fabric 102 can receive the signals indicative of the detected conditions at the respective sites in the fabric 102 from the sensor nodes in the sensor array 104. Further, the event detection component 128 can analyze the state of the fabric 102 to detect an occurrence of an event based on the detected conditions at the sites in the fabric 102. Responsive to detection of the occurrence of the event, the event detection component 128 can cause a notification 134 indicative of the event to be generated. More particularly, the event detection component 128 can transmit, via the transmitter 116, an indicator specifying that the event has occurred responsive to the detection of the occurrence of the event. The indicator can be transmitted to the computing system 402.

The event handler component 136 of the computing system 402 can receive the indicator, which can cause the computing system 402 to output the notification 134 indicative of the event. For instance, the event handler component 136 can output the notification 134 indicative of the event responsive to receipt of the indicator specifying that the event has occurred.

Figure 7:
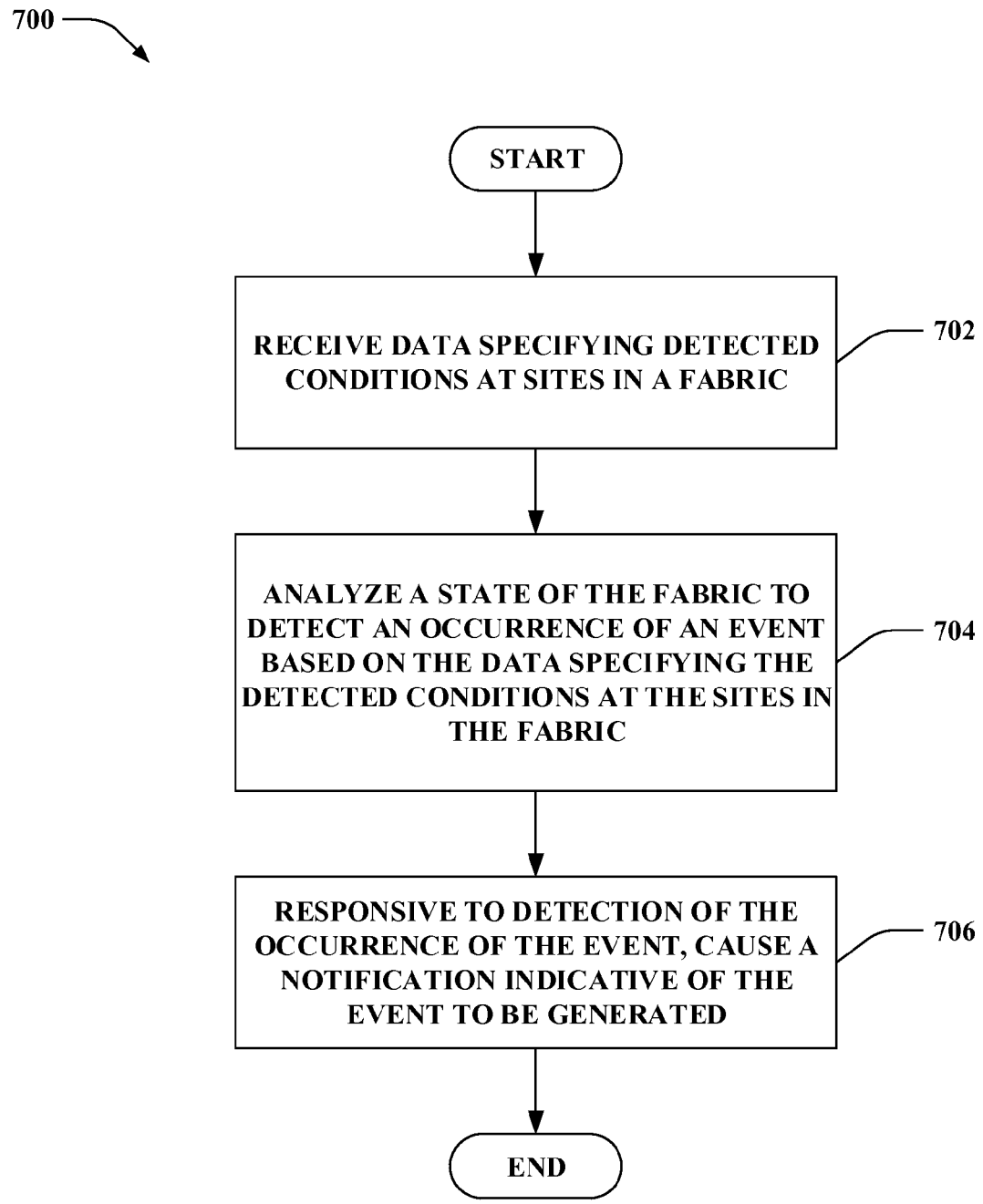
FIG. 7 is a flow diagram that illustrates an exemplary methodology of controlling notification generation.

FIG. 7 illustrates an exemplary methodology relating to detecting an event in a fabric and/or generating a notification responsive to detection of such event. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 7 illustrates a methodology 700 of controlling notification generation. At 702, data specifying detected conditions at sites in a fabric can be received. The sites correspond to sensor nodes in a sensor array. For example, signals indicative of the detected conditions at the sites in the fabric can be received from the sensor nodes in the sensor array. According to another example, the data specifying the detected conditions at the sties in the fabric can be wirelessly received from a transmitter included in the fabric. At 704, a state of the fabric can be analyzed to detect an occurrence of an event. The state of the fabric can be analyzed based on the data specifying the detected conditions at the sites in the fabric. The event can be a tear of the fabric, a torsion in the fabric greater than a threshold torsion, or a strain in the fabric greater than a threshold strain. At 706, responsive to detection of the occurrence of the event, a notification indicative of the event can be caused to be generated. Pursuant to an example, the notification indicative of the event can be generated and outputted responsive to the detection of the occurrence of the event. According to another example, an indicator specifying the event has occurred can be transmitted to a computing system responsive to the detection of the occurrence of the event, where the indicator can cause the computing system to output the notification indicative of the event. It is to be appreciated that the methodology 700 can be performed by the control unit 110 of the fabric 102 or the computing system 118, for instance.

Figure 8:
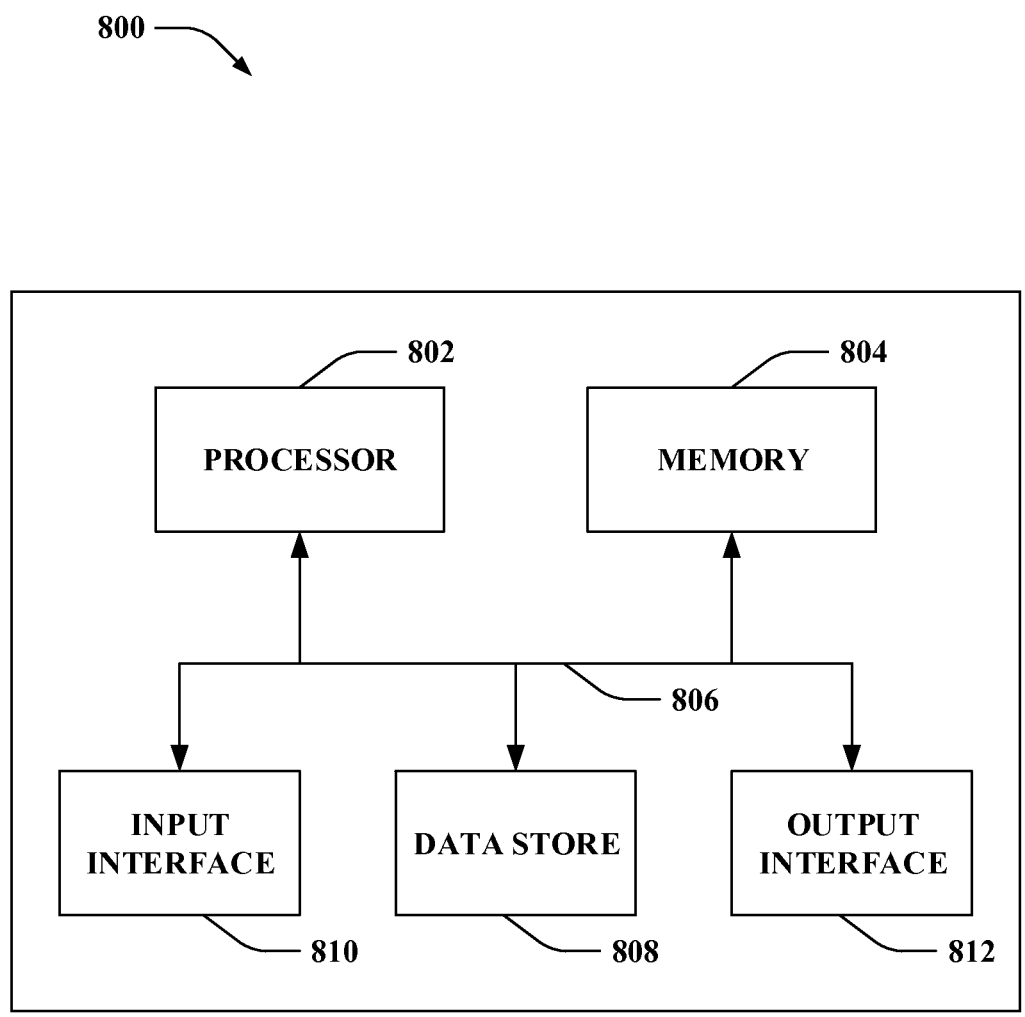
FIG. 8 illustrates an exemplary computing device.

Referring now to FIG. 8, a high-level illustration of an exemplary computing device 800 that can be used in accordance with the systems and methodologies disclosed herein is illustrated. For instance, the computing device 800 may be used in a system that detects events and/or generates notifications based on detected conditions at sites in a fabric. According to another example, the computing device 800 can be used in a system that outputs a notification generated responsive to detection of an occurrence of an event as described herein. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store data specifying detected conditions at sites in the fabric, notifications, configuration data, data model(s), and so forth.

The computing device 800 additionally includes a data store 808 that is accessible by the processor 802 by way of the system bus 806. The data store 808 may include executable instructions, data specifying detected conditions at sites in the fabric, notifications, configuration data, data model(s), etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Figure 9:
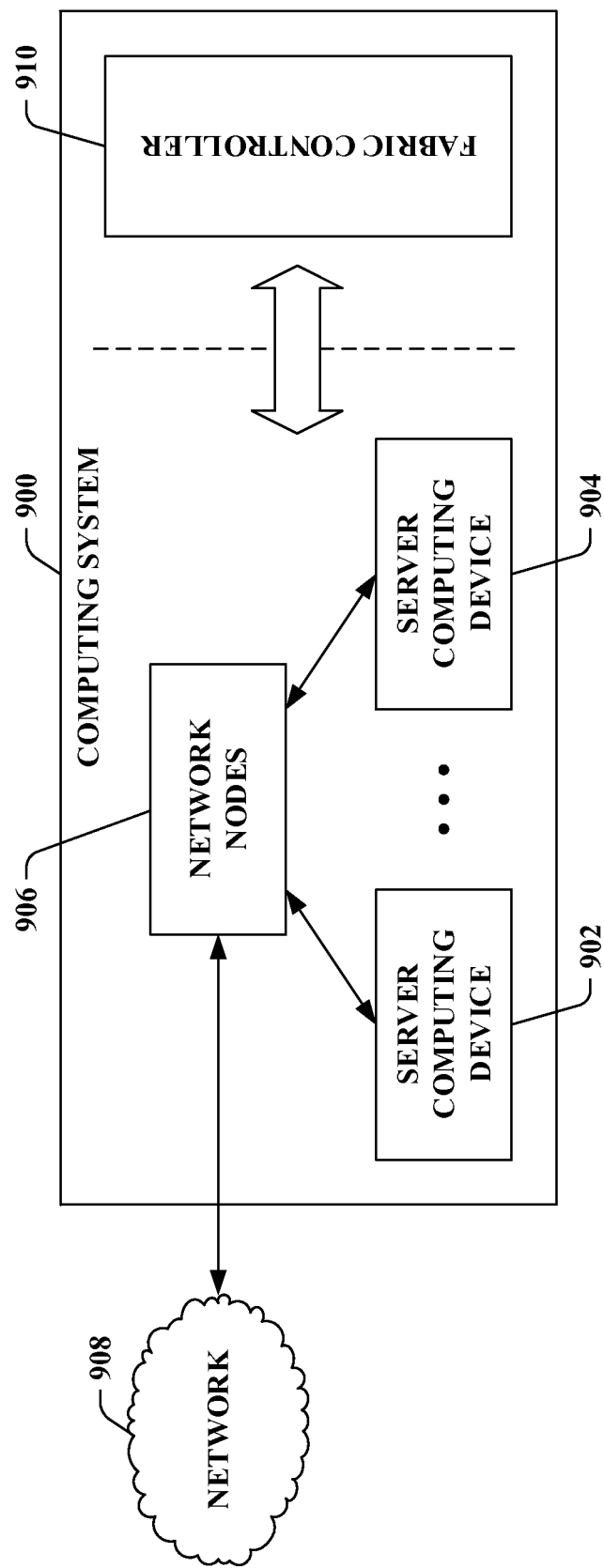
FIG. 9 illustrates an exemplary computing system.

Turning to FIG. 9, a high-level illustration of an exemplary computing system 900 that can be used in accordance with the systems and methodologies disclosed herein is illustrated. For instance, the computing system 900 can be or include the computing system 118. Additionally or alternatively, the computing system 118 can be or include the computing system 900. By way of another example, the computing system 900 can be or include the computing system 402. Additionally or alternatively, the computing system 402 can be or include the computing system 900.

The computing system 900 includes a plurality of server computing devices, namely, a server computing device 902, . . . , and a server computing device 904 (collectively referred to as server computing devices 902-904). The server computing device 902 includes at least one processor and a memory; the at least one processor executes instructions that are stored in the memory. The instructions may be, for instance, instructions for implementing functionality described as being carried out by one or more components discussed above or instructions for implementing one or more of the methods described above. Similar to the server computing device 902, at least a subset of the server computing devices 902-904 other than the server computing device 902 each respectively include at least one processor and a memory. Moreover, at least a subset of the server computing devices 902-904 include respective data stores.

Processor(s) of one or more of the server computing devices 902-904 can be or include the processor 122. Further, a memory (or memories) of one or more of the server computing devices 902-904 can be or include the memory 124. Moreover, a data store (or data stores) of one or more of the server computing devices 902-904 can be or include the data store 132.

Additionally or alternatively, processor(s) of one or more of the server computing devices 902-904 can be or include the processor 404. Further, a memory (or memories) of one or more of the server computing devices 902-904 can be or include the memory 406.

The computing system 900 further includes various network nodes 906 that transport data between the server computing devices 902-904. Moreover, the network nodes 902 transport data from the server computing devices 902-904 to external nodes (e.g., external to the computing system 900) by way of a network 908. The network nodes 902 also transport data to the server computing devices 902-904 from the external nodes by way of the network 908. The network 908, for example, can be the Internet, a cellular network, or the like. The network nodes 906 include switches, routers, load balancers, and so forth.

A fabric controller 910 of the computing system 900 manages hardware resources of the server computing devices 902-904 (e.g., processors, memories, data stores, etc. of the server computing devices 902-904). The fabric controller 910 further manages the network nodes 906. Moreover, the fabric controller 910 manages creation, provisioning, de-provisioning, and supervising of virtual machines instantiated upon the server computing devices 902-904.

Various examples are now set forth.

Example 1

A fabric, comprising: a sensor array that comprises a plurality of sensor nodes arranged at respective sites in the fabric, the sensor nodes configured to output signals indicative of detected conditions at the respective sites in the fabric; a transmitter; and a control unit configured to: receive the signals indicative of the detected conditions at the respective sites in the fabric from the sensor nodes in the sensor array; and transmit, using the transmitter, data specifying the detected conditions at the respective sites in the fabric, the data transmitted to a computing system for analyzing a state of the fabric to detect an occurrence of an event, the event being at least one of a tear of the fabric, a torsion in the fabric greater than a threshold torsion, or a strain in the fabric greater than a threshold strain.

Example 2

The fabric according to Example 1, the sensor array being embedded in the fabric.

Example 3

The fabric according to Example 1, the sensor array being mechanically coupled to the fabric.

Example 4

The fabric according to any of Examples 1-3 being formed into a garment.

Example 5

The fabric according to any of Examples 1-4, the sensor nodes comprise respective Global Positioning System (GPS) sensors, the signals outputted by the GPS sensors being indicative of detected geographic coordinates at the respective sites in the fabric.

Example 6

The fabric according to any of Examples 1-5, the sensor nodes comprise respective magnetometers, the signals outputted by the magnetometers being indicative of detected magnetic moments at the respective sites in the fabric.

Example 7

The fabric according to any of Examples 1-6, the sensor nodes comprise respective accelerometers, the signals outputted by the accelerometers being indicative of detected accelerations at the respective sites in the fabric.

Example 8

The fabric according to any of Examples 1-7, the sensor nodes comprise respective Radio Frequency Identification (RFID) tags, the sensor array further comprises a plurality of RFID readers, the signals outputted being indicative of detected distances between the RFID tags and the RFID readers.

Example 9

The fabric according to any of Examples 1-8, further comprising a tag that identifies the sensor array, the tag being readable by the computing system to initiate analyzing the state of the fabric by the computing system.

Example 10

The fabric according to any of Examples 1-9, further comprising a power source that supplies power to the sensor array, the transmitter, and the control unit.

Example 11

A computing system, comprising: at least one processor; and memory that comprises computer-executable instructions that, when executed by the at least one processor, cause the at least one processor to perform acts including: receiving, from a transmitter comprised in a fabric, data specifying detected conditions at sites in the fabric; analyzing a state of the fabric to detect an occurrence of an event, the state of the fabric being analyzed based on the data specifying the detected conditions at the sites in the fabric, the event being at least one of a tear of the fabric, a torsion in the fabric greater than a threshold torsion, or a strain in the fabric greater than a threshold strain; and responsive to detection of the occurrence of the event, causing a notification indicative of the event to be generated.

Example 12

The computing system according to Example 11, the memory further comprising computer-executable instructions that, when executed by the at least one processor, cause the at least one processor to perform acts including: reading a tag of the fabric; and responsive to the tag being read, initiating the analyzing of the state of the fabric.

Example 13

The computing system according to any of Examples 11-12, the memory further comprising computer-executable instructions that, when executed by the at least one processor, cause the at least one processor to perform acts including: responsive to the detection of the occurrence of the event: generating the notification indicative of the event; and outputting the notification indicative of the event.

Example 14

The computing system according to any of Examples 11-12, the memory further comprising computer-executable instructions that, when executed by the at least one processor, cause the at least one processor to perform acts including: responsive to the detection of the occurrence of the event, transmitting an indicator specifying that the event has occurred to a disparate computing system, wherein the indicator causes the disparate computing system to output the notification indicative of the event.

Example 15

The computing system according to any of Examples 11-14, the memory further comprising computer-executable instructions that, when executed by the at least one processor, cause the at least one processor to perform acts including: detecting, using a machine learning classification algorithm, the occurrence of the event based on the data specifying the detected conditions at the sites in the fabric.

Example 16

The computing system according to any of Examples 11-14, the memory further comprising computer-executable instructions that, when executed by the at least one processor, cause the at least one processor to perform acts including: detecting, using a heuristic, the occurrence of the event based on the data specifying the detected conditions at the sites in the fabric.

Example 17

A method of controlling notification generation, comprising: receiving data specifying detected conditions at sites in a fabric, the sites corresponding to sensor nodes in a sensor array; analyzing a state of the fabric to detect an occurrence of an event, the state of the fabric being analyzed based on the data specifying the detected conditions at the sites in the fabric, the event being at least one of a tear of the fabric, a torsion in the fabric greater than a threshold torsion, or a strain in the fabric greater than a threshold strain; and responsive to detection of the occurrence of the event, causing a notification indicative of the event to be generated.

Example 18

The method according to Example 17, receiving the data specifying the detected conditions at the sites in the fabric further comprising: receiving signals indicative of the detected conditions at the sites in the fabric from the sensor nodes in the sensor array.

Example 19

The method according to any of Examples 17-18, the method being performed by a control unit, wherein the fabric comprises the control unit.

Example 20

The method according to Example 17, the data specifying the detected conditions at the sites in the fabric being wirelessly received from a transmitter comprised in the fabric.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:
1. A fabric, comprising:
   a sensor array that comprises a plurality of sensor nodes arranged at respective sites in the fabric, the sensor nodes comprise respective Radio Frequency Identifi- cation (RFID) tags, the sensor array further comprises a plurality of RFID readers, the sensor nodes configured to output signals indicative of detected conditions at the respective sites in the fabric, the detected conditions at the respective sites in the fabric comprise detected distances between the RFID tags and the RFID readers;

a transmitter; and a control unit configured to:

receive the signals indicative of the detected conditions at the respective sites in the fabric from the sensor nodes in the sensor array; and transmit, using the transmitter, data specifying the detected conditions at the respective sites in the fabric, the data transmitted to a computing system for analyzing a state of the fabric to detect an occurrence of an event, the event being at least one of a tear of the fabric, a torsion in the fabric greater than a threshold torsion, or a strain in the fabric greater than a threshold strain.

2. The fabric of claim 1, the sensor array being embedded in the fabric.

3. The fabric of claim 1, the sensor array being mechanically coupled to the fabric.

4. The fabric of claim 1 being formed into a garment.

5. The fabric of claim 1, the sensor nodes further comprise respective magnetometers, the detected conditions at the respective sites in the fabric further comprise detected magnetic moments at the respective sites in the fabric outputted by the magnetometers.

6. The fabric of claim 1, the sensor nodes further comprise respective accelerometers, the detected conditions at the respective sites in the fabric further comprise detected accelerations at the respective sites in the fabric outputted by the accelerometers.

7. The fabric of claim 1, the sensor nodes further comprise respective Global Positioning System (GPS) sensors, the detected conditions at the respective sites in the fabric further comprise detected geographic coordinates at the respective sites in the fabric outputted by the GPS sensors.

8. The fabric of claim 1, further comprising a tag that identifies the sensor array, the tag being readable by the computing system to initiate analyzing the state of the fabric by the computing system.

9. The fabric of claim 1, further comprising a power source that supplies power to the sensor array, the transmitter, and the control unit.

10. A computing system, comprising:

at least one processor; and memory that comprises computer-executable instructions that, when executed by the at least one processor, cause the at least one processor to perform acts including:

receiving, from a transmitter comprised in a fabric, data specifying detected conditions at sites in the fabric, the sites corresponding to sensor nodes in a sensor array, the sensor nodes comprise respective Radio Frequency Identification (RFID) tags, the sensor array further comprises a plurality of RFID readers, the detected conditions at the sites in the fabric comprise detected distances between the RFID tags and the RFID readers;

analyzing a state of the fabric to detect an occurrence of an event, analyzing the state of the fabric based on the data specifying the detected conditions at the sites in the fabric, the event being at least one of a tear of the fabric, a torsion in the fabric greater than a threshold torsion, or a strain in the fabric greater than a threshold strain; and responsive to detection of the occurrence of the event, causing a notification indicative of the event to be generated.

11. The computing system of claim 10, the memory further comprising computer-executable instructions that, when executed by the at least one processor, cause the at least one processor to perform acts including:

reading a tag of the fabric; and responsive to the tag being read, initiating the analyzing of the state of the fabric.

12. The computing system of claim 10, the memory further comprising computer-executable instructions that, when executed by the at least one processor, cause the at least one processor to perform acts including:

responsive to the detection of the occurrence of the event:

generating the notification indicative of the event; and outputting the notification indicative of the event.

13. The computing system of claim 10, the memory further comprising computer-executable instructions that, when executed by the at least one processor, cause the at least one processor to perform acts including:

responsive to the detection of the occurrence of the event, transmitting an indicator specifying that the event has occurred to a disparate computing system, wherein the indicator causes the disparate computing system to output the notification indicative of the event.

14. A method of controlling notification generation, comprising:

receiving data specifying detected conditions at sites in a fabric, the sites corresponding to sensor nodes in a sensor array, the sensor nodes comprise respective Radio Frequency Identification (RFID) tags, the sensor array further comprises a plurality of RFID readers, the detected conditions at the respective sites in the fabric comprise detected distances between the RFID tags and the RFID readers;

analyzing a state of the fabric to detect an occurrence of an event, analyzing the state of the fabric based on the data specifying the detected conditions at the sites in the fabric, the event being at least one of a tear of the fabric, a torsion in the fabric greater than a threshold torsion, or a strain in the fabric greater than a threshold strain; and responsive to detection of the occurrence of the event, causing a notification indicative of the event to be generated.

15. The method of claim 14, receiving the data specifying the detected conditions at the sites in the fabric further comprising:

receiving signals indicative of the detected conditions at the sites in the fabric from the sensor nodes in the sensor array.

16. The method of claim 15, the method being performed by a control unit, wherein the fabric comprises the control unit.

17. The method of claim 14, the data specifying the detected conditions at the sites in the fabric being wirelessly received from a transmitter comprised in the fabric.

18. The fabric of claim 1, the occurrence of the event detected by the computing system using a machine learning classification algorithm.

19. The computing system of claim 10, the detected conditions at the sites in the fabric further comprise detected geographic coordinates at the sites in the fabric outputted by respective Global Positioning System (GPS) sensors.

20. The method of claim 14, the sensor nodes further comprise respective Global Positioning System (GPS) sensors, and the detected conditions at the sites in the fabric further comprise detected geographic coordinates at the sites in the fabric outputted by the GPS sensors.

\* \* \* \* \*